United States Patent [19]
Ohsawa et al.

[11] Patent Number: 5,282,256
[45] Date of Patent: Jan. 25, 1994

[54] BINARY IMAGE DATA CODING METHOD HAVING THE FUNCTION OF CORRECTING ERRORS DERIVED FROM CODING

[75] Inventors: Hidefumi Ohsawa, Kawaguchi; Akihiro Katayama, Kawasaki, both of Japan

[73] Assignee: Canon Kabushiki Kaisha, Tokyo, Japan

[21] Appl. No.: 900,761

[22] Filed: Jun. 19, 1992

Related U.S. Application Data
[63] Continuation of Ser. No. 350,342, May 11, 1989.

[30] Foreign Application Priority Data

May 13, 1988 [JP] Japan ................................ 63-114833
May 13, 1988 [JP] Japan ................................ 63-114834

[51] Int. Cl.⁵ ............................................. G06K 9/36
[52] U.S. Cl. ................................. 382/56; 358/261.2
[58] Field of Search ................ 382/56; 358/261.2, 430

[56] References Cited
U.S. PATENT DOCUMENTS

| | | | |
|---|---|---|---|
| 3,726,993 | 4/1973 | Lavalle | 358/426 |
| 3,769,453 | 10/1973 | Bahl et al. | 358/430 |
| 4,144,547 | 3/1979 | Stoffel | 358/340 |
| 4,809,350 | 2/1989 | Shimoni et al. | 382/56 |
| 4,860,112 | 8/1989 | Nichols et al. | 382/56 |
| 4,876,610 | 10/1989 | Ohsawa et al. | 382/54 |
| 4,922,544 | 5/1990 | Stansfield et al. | 382/56 |
| 4,944,023 | 7/1990 | Imao et al. | 382/56 |
| 4,947,448 | 8/1990 | Nakayama et al. | 382/56 |
| 5,113,457 | 5/1992 | Enomoto et al. | 382/56 |

*Primary Examiner*—David K. Moore
*Assistant Examiner*—David R. Anderson
*Attorney, Agent, or Firm*—Fitzpatrick, Cella, Harper & Scinto

[57] ABSTRACT

An image data coding method for a case where image data are transmitted or filed upon being binary coded includes steps of replacing a predetermined pixel by a predicted value predicted by a plurality of pixels peripheral to the predetermined pixel, in conformance with a coded image data compression technique, and performing binary coding while dispersing an error, which is generated by the replacement, among peripheral pixels. Also provided are a variety of image data coding apparatus for practicing this image data coding method. The invention makes it possible to perform binary coding and compression of half-tone image data very efficiently.

6 Claims, 13 Drawing Sheets

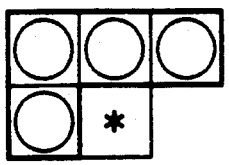
FIG. 17A
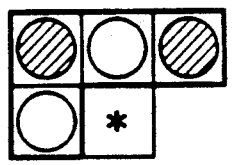
FIG. 17B
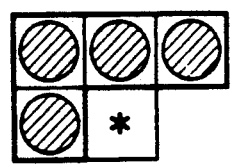
FIG. 17C
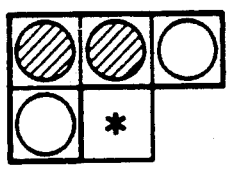
FIG. 17D
| PATTERN | WHITE OCCURRENCE PROBABILITY | BLACK OCCURRENCE PROBABILITY |
|---|---|---|
| (a) | 7/8 | 1/8 |
| (b) | 1/2 | 1/2 |
| (c) | 1/8 | 7/8 |
| (d) | 1/2→3/4 | 1/2→1/4 |
FIG. 18

BINARY IMAGE DATA CODING METHOD HAVING THE FUNCTION OF CORRECTING ERRORS DERIVED FROM CODING

This application is a continuation of application Ser. No. 07/350,342 filed May 11, 1989.

BACKGROUND OF THE INVENTION

1. Field of the Invention

This invention relates to a method and apparatus for coding image data and, more particularly, to binary coding of image data and compression of image data in image transmission and image filing.

2. Description of the Prior Art

Image data compression in the prior art involves a variety of techniques for the purpose of shortening data transmission time and reducing data file capacity. In the field of facsimile transmission, the modified Huffman method (MH method) of an encoding system using the run length of black-and-white pixels, which is one characterizing quantity of an image, is employed as a compression technique. However, occasions on which halftone images such as photographs are transmitted or filed are increasing.

The binary coding of a half-tone image by the dither method generally employed in the prior art is known to be unsuitable for compression techniques such as MH coding since the run of a binary-coded image is divided. For this reason, various improvements have been attempted focusing on the periodicity of dither image data.

An error diffusion method is available as another method of reproducing half tones. This method, which entails dispersing a concentration error that occurs in binary coding into unprocessed peripheral pixels and then proceeding with binary coding, is the focus of much attention recently since it provides better tonality and resolution than does the dither method. However, the image data processed by the error diffusion method do not possess any conspicuous periodicity in addition to the fact that the run is divided. When these image data are compressed as by MH coding, the amount of data increases by a factor of about 1.5 to 2 instead.

Another method that has been considered, as shown in FIG. 10, involves binary coding a digital signal from input means 80 by digitizing means 81, and coding missed pixels, which are predicted by predicting means 82, by a coder 83. However, even in this case the run of missed pixels is short, as a result of which data compression cannot be performed by MH coding.

SUMMARY OF THE INVENTION

An object of the present invention is to provide an image data coding method for binary coding and compressing half-tone image data highly efficiently, as well as an apparatus for practicing this method.

Another object of the present invention is to provide an image data coding method for performing binary coding suited to a coded image data compression technique, as well as an apparatus for practicing this method.

Yet another object of the present invention is to provide an image data coding method for thinning out pixels efficiently when image data are transmitted or written, and for interpolating the thinned-out pixels efficiently when the image data are received or read, as well as an apparatus for practicing this method.

A further object of the present invention is to provide an image data coding method in which the compression rate by the MH method is raised by improving predicted hit rate and performing predictive coding, as well as an apparatus for practicing this method.

Still another object of the present invention is to provide an image data coding method in which the compression rate of arithmetic coding is raised by lowering the probability that numerically inferior symbols having a low frequency of generation will occur, as well as an apparatus for practicing this method.

The foregoing objects are attained by an image data coding method suited to a coded image data compression technique, characterized by replacing a predetermined pixel by a predicted value predicted by a plurality of pixels peripheral to said predetermined pixel, and performing binary coding while dispersing an error, which is generated by the replacement, among peripheral pixels.

In an embodiment, further steps include replacing predetermined pixels by predicted values at a predetermined period, thinning out pixels replaced by the predicted values when image data are transmitted or written, and interpolating the thinned-out pixels, by measured values based on a similar prediction, when image data are received or read.

Further, predetermined pixels are replaced by predicted values so as to raise a predicted hit rate, and compression is performed by the MH method after carrying out predictive coding based on predicted hits.

Further, predetermined pixels are replaced by predicted values so as to lower the probability of occurrence of numerically inferior symbols having a low frequency of generation, and arithmetic coding is performed.

According to the invention, the foregoing objects are attained by an image data coding apparatus comprising binary coding means for binary coding image data based on a predetermined threshold value, replacing means for replacing a predetermined pixel by binary data corresponding to image data of a plurality of pixels peripheral to the predetermined pixel, dispersing means for dispersing an error, which is generated by the binary coding and the replacement, among peripheral pixels, and output means for thinning out and outputting pixels, replaced by the replacing means, from binary image data formed by the binary coding means and replacing means.

The foregoing objects are also attained by an image data decoding apparatus comprising input means for inputting binary image data, and interpolating means for adding predetermined pixels to the binary image data, which are inputted by the input means, by binary data corresponding to image data of a plurality of pixels.

The foregoing objects are also attained by an image data coding apparatus comprising coding means for performing predictive coding of image data, hit rate control means for controlling predicted hit rate, and error dispersing means for dispersing a quantization error, which is produced in image data by the control of predicted hit rate, among peripheral pixels.

The foregoing objects are also attained by an image data coding apparatus comprising coding means for arithmetic coding of image data, occurrence probability modifying means for lowering probability of occurrence of numerically inferior symbols having a low frequency of generation, and error dispersing means for dispersing a quantization error, which is produced in image data by modifying the probability of occurrence, among peripheral pixels.

Thus, according to the present invention, there can be provided an image data coding method for binary coding and compressing half-tone image data highly efficiently, as well as an apparatus for practicing this method.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 17A through 17D are views for describing predicted patterns in the third example; and FIG. 18 is a view for describing the probability of occurrence of predicted patterns in the third example.

DESCRIPTION OF THE PREFERRED EMBODIMENTS

Example of compression coding by thinning out of predicted values

Figure 1:
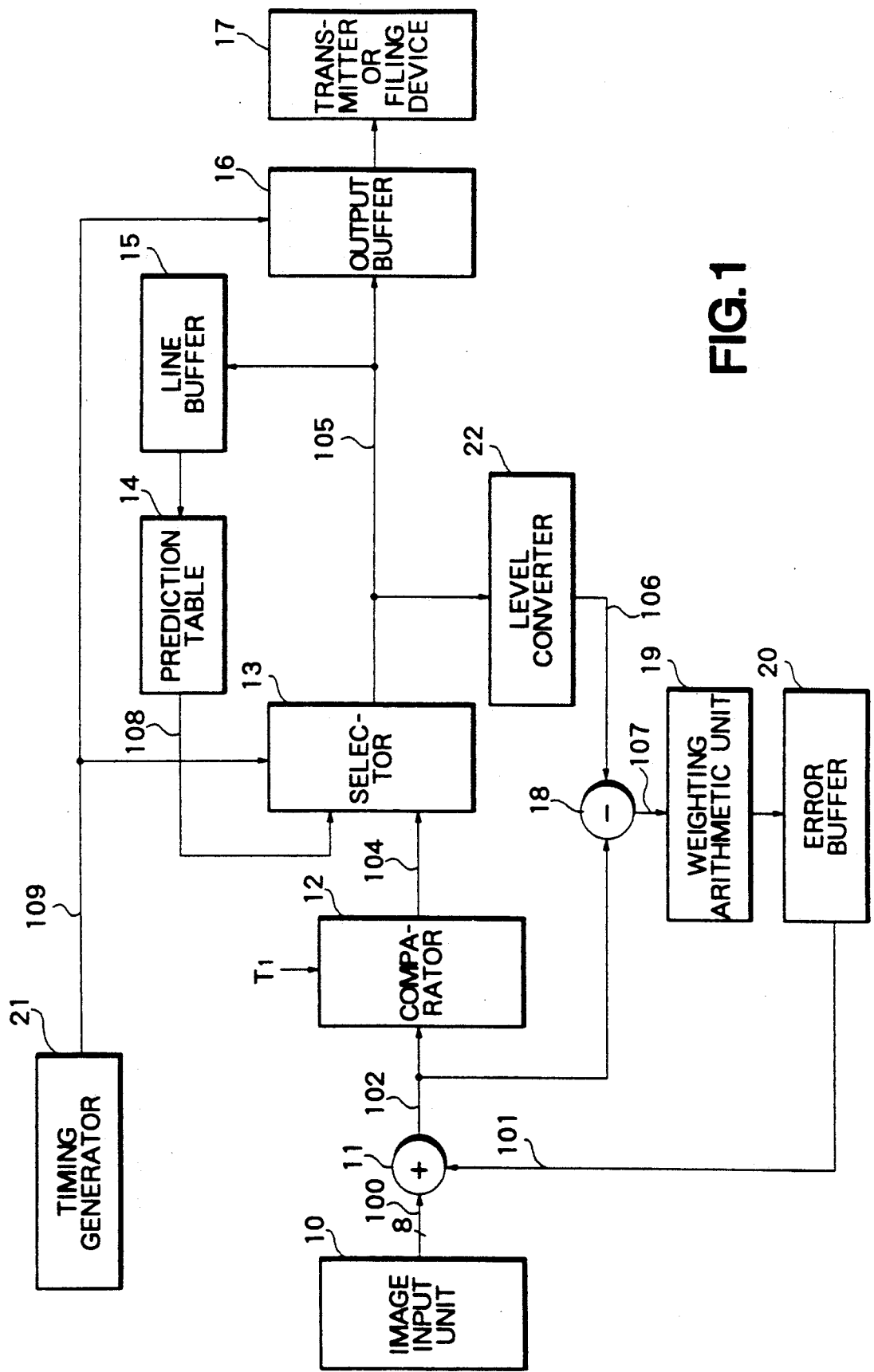
FIG. 1 is a block diagram of image data compression in a first example.

FIG. 1 is a block diagram of image data compression in an embodiment of the invention.

Input data 100 from an image data input unit 10 is a digital signal having eight-bit tone information. The items of input data 100 are counted. An error buffer 20 outputs a correction signal 101 of a pixel of interest. The signal 101 is added to the image data 100 by an adder 11, the output of which is a signal 102 indicative of the sum. This signal is compared with a fixed threshold value $T_1$ by a comparator 12, the output 104 of which is "1" when signal 102 is larger than $T_1$ and "0" when signal 102 is smaller. The comparator output 104 enters one input terminal of a selector 13.

The output of the selector 13 is a binary-coded signal 105, which enters a level converter 22, where one-bit data is returned to eight-bit data ("0" → "0", "1" → "255"). A level-converted output signal 106 from the level converter 22 is applied to a subtracter 18, which calculates the difference between the converted signal 106 and the signal 102 from adder 11. The result is a binary-coded error data signal 107 which, in order to be dispersed among unprocessed peripheral pixels, is made a signal quantity conforming to a distribution ratio by a weighting arithmetic unit 19. This is delivered to the error buffer 20 where it is accumulated in the memory of the corresponding pixel position. The result is the correction signal 101.

The binary-coded signal 105 from the selector 13 is applied also to a line buffer 15, where several lines of the signal are stored. The output of the line buffer 15 is applied to a prediction table 14, at which a predicted value 108 of the pixel of interest is obtained and outputted by referring to the data from the line buffer 15. The predicted value 108 is applied to the other input terminal of the selector 13.

A timing signal generator 21 generates a timing signal 109, which serves as a select signal of the selector 13 and in response to which the selector 13 switches between the comparator output signal 104 and the predicted value 108. Thus, at a timing that is predetermined, the predicted value 108 from the prediction table 14 is outputted to an output buffer 16 as the binary-coded signal 105.

Pixel data for which the predicted value 108 from the prediction table 14 has been selected is thinned out from the binary-coded signal 105 by the output buffer 16. The timing at which this occurs is decided by the timing signal 109. The signal from the output buffer 16 is sent to a transmitter or filing device 17.

Figure 2:
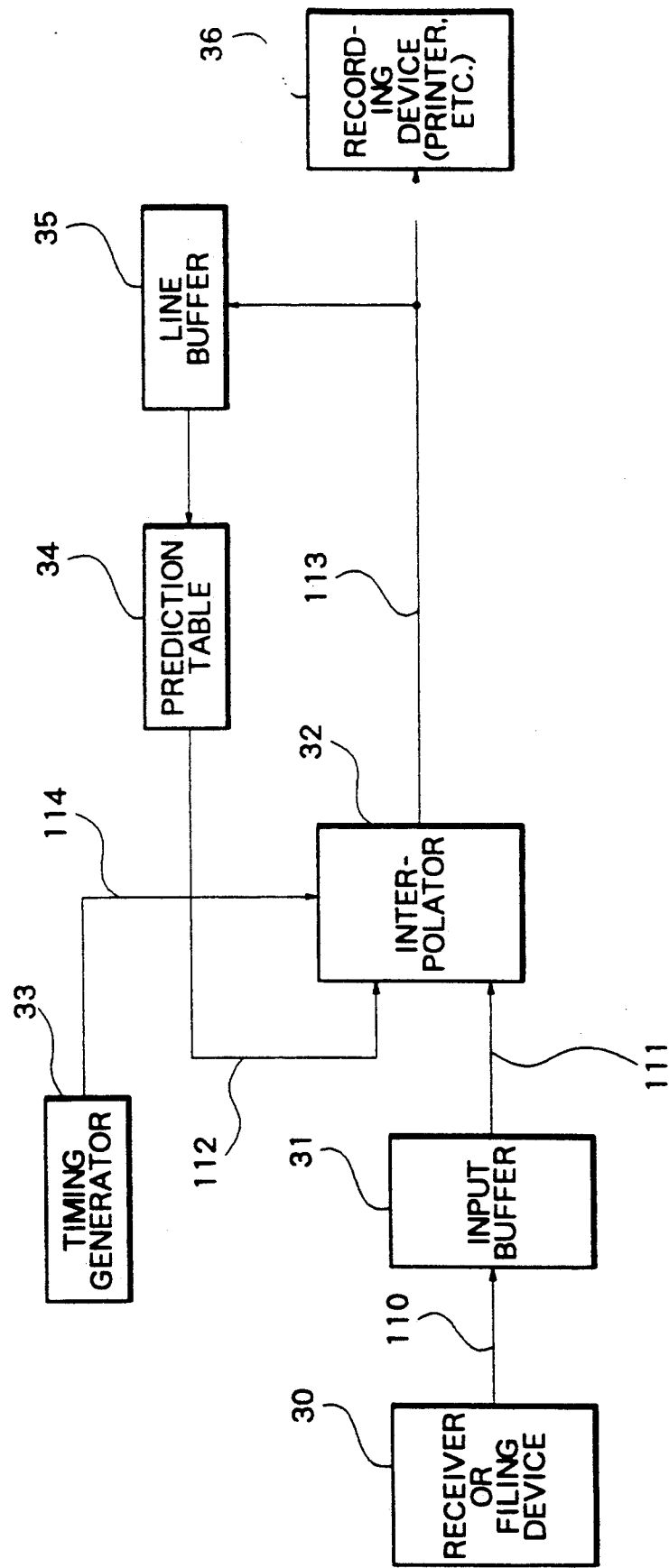
FIG. 2 a block diagram of image data expansion in the first example.

FIG. 2 is a block diagram of image data expansion according to the present embodiment.

An input signal 110 from a receiver or filing device 30 is preserved temporarily by an input buffer 31, which outputs a signal 111 indicative of the preserved input signal. The signal 111 enters an interpolator 32, where it is interpolated by a predicted value 112 from a prediction table 34. The interpolator 32 delivers an output signal 113 to a recording device such as a printer to form an image.

The output signal 113 is applied also to a line buffer 35, where several lines of data are stored. These items of data in the line buffer 35 serve as a reference signal from the prediction table 34. The interpolation timing is provided by a timing signal 114 from a timing generator 33. Here the prediction table 34 corresponds to the prediction table 14 in FIG. 1, and the timing signal 114 from the timing generator 33 corresponds to the timing signal 109 from the timing generator 33.

Figures 3A, 3B, 4:
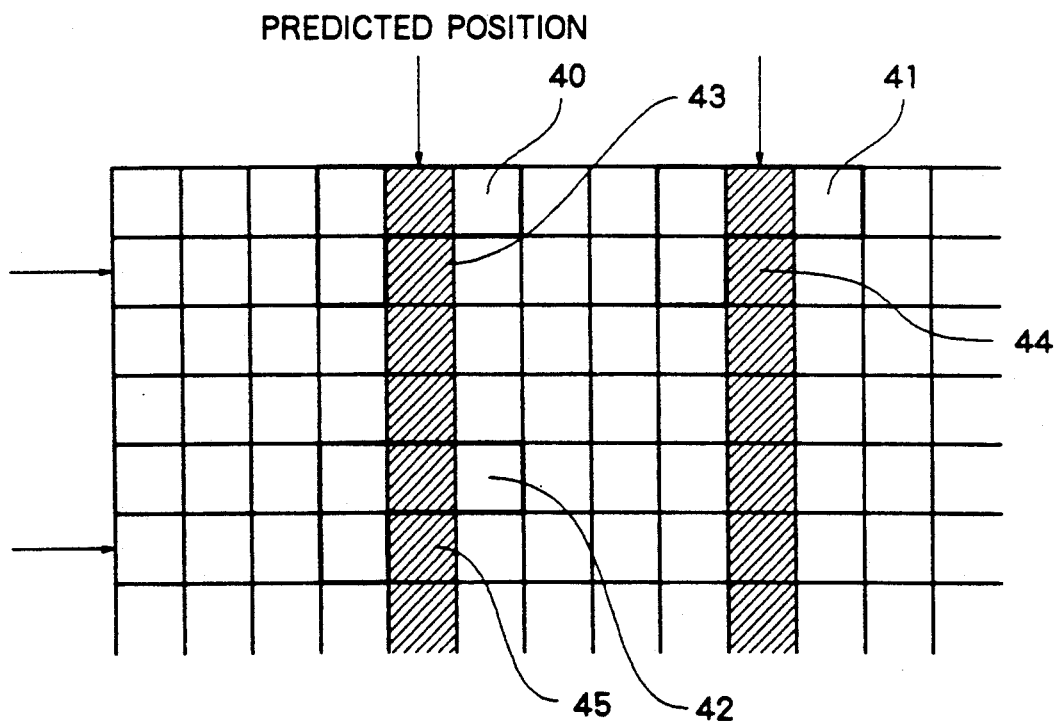
FIG. 3A is a view for describing a predictive method.
FIG. 3B is an example of a prediction table.
FIG. 4 is a view for describing the thinning out of data and as interpolated positions of data in the first example.

FIG. 3A is a view for describing a method of prediction by prediction table. A predicted value $X_0$ of a pixel of interest X is obtained by a logical function f from peripheral pixels $X_1$, $X_2$, $X_3$, $X_4$ in the manner $X_0 = f(X_1, X_2, X_3, X_4)$ In general, this function is obtained as a table from plural items of image data and is stored in a ROM or the like, wherein peripheral pixel data serve as input addresses and an output is the predicted value. FIG. 3B illustrates an example of the prediction tables 14, 34. In this simple example, predictions are made in accordance with a number of values for $X_1$ - $X_4$, but a variety of predictions are conceivable depending upon the image dealt with or differences in the range of the peripheral pixels for the prediction. The invention is in no way limited to this example. The same is true with regard to second and third examples set forth below.

FIG. 4 illustrates pixel positions when giving priority to the values in the prediction table 14 in the present embodiment. When image data indicative of the pixels shown by the shaded portions in FIG. 4, e.g., pixels 43, 44 and 45, are subjected to binary coding processing, prediction is performed based on binary data of reference windows 40, 41 and 42 and the result is adopted as binary data of the above mentioned pixels. Binary-coded error data generated by this processing is dispersed among the peripheral pixels in the same manner as other error data.

Figure 5:
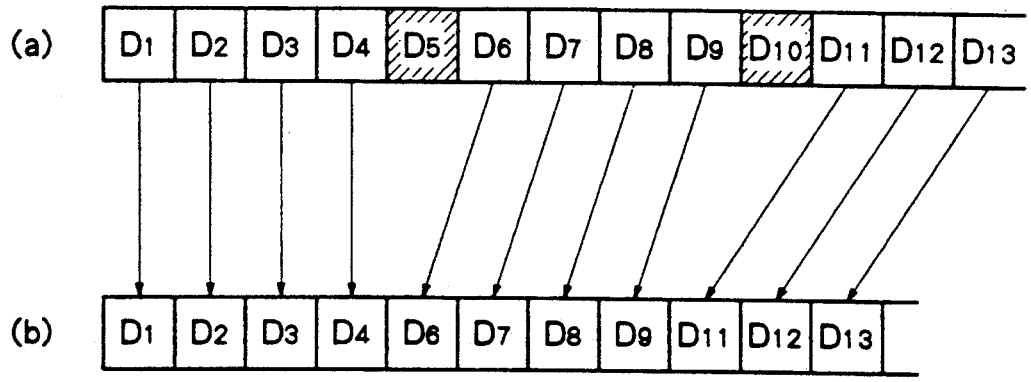
FIG. 5 is a view for describing a method of thinning out data i first example.

FIG. 5 is a view for describing the thinning out of data performed by the output buffer 16. Let items of data $D_5$, $D_{10}$ from among a data series (a) $(D_1, D_2 ...)$ of the binary-coded signal 105 be the predicted values. In such case, a data series (b), from which these data will have been thinned out, will be delivered to the transmitter or filing device 17 at the output stage.

Figure 6:
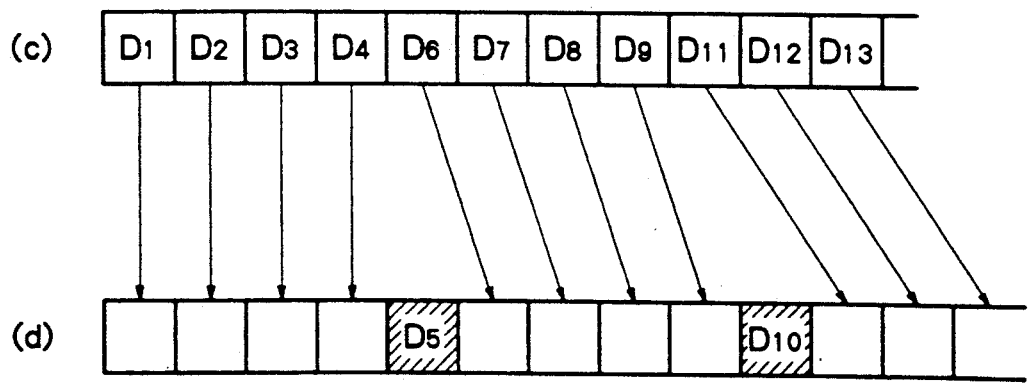
FIG. 6 is a view for describing a method of interpolating data in the first example.

FIG. 6 is a view for describing the data interpolation performed by the interpolator 32. Here predicted values $D_5'$, $D_{10}'$ from the prediction table 34 are added to an input signal series (c) at a predetermined timing to obtain an interpolated signal (d). Since $D_5$, $D_{10}$ in FIG. 5 and $D_5'$, $D_{10}'$ in FIG. 6 are entirely equivalent when the same prediction tables are used, information can be perfectly reconstructed.

Figure 7:
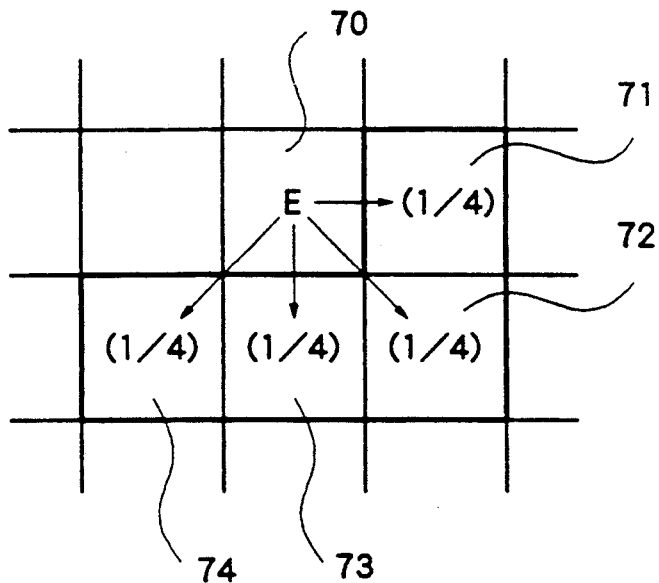
FIG. 7 is a view for describing error diffusion.

FIG. 7 is a view for describing the functions of the weighting arithmetic unit 19 and error buffer 20. In the present example, an error "E", which is the binary-coded error data 107 generated at a position 70 of a pixel of interest, is dispersed in quarters to each of four memories 71, 72, 73 and 74 corresponding to the positions of the peripheral pixels. In the next processing step, the position of the pixel of interest becomes 71 and the error is dispersed among the pixels peripheral to this pixel in the same manner. The errors are accumulated in successive fashion and ultimately a signal indicative of the accumulation of the errors from the four peripheral pixels is obtained. This signal is the correction signal 101 in FIG. 1. In the present embodiment, a method is described in which an error is distributed evenly among four peripheral pixels in order to simplify the explanation. However, the invention is not limited to such an arrangement. The same holds with regard to error dispersion in second and third examples hereinbelow.

FIGS. 8A through 8D show other embodiments of the pixel positions of thinned-out data.

Figure 8A:
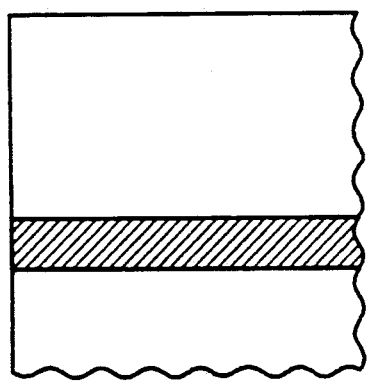
FIGS. 8A through 8D are views illustrating other embodiments of the thinning out of data and interpolated positions in the first example.
Figure 8B:
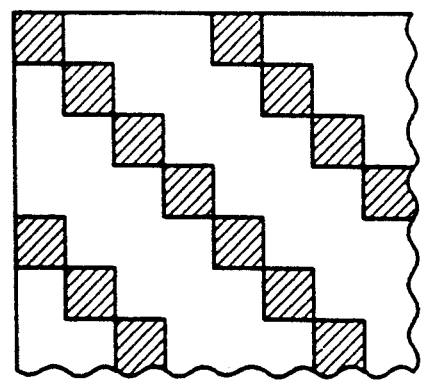
Figure 8C:
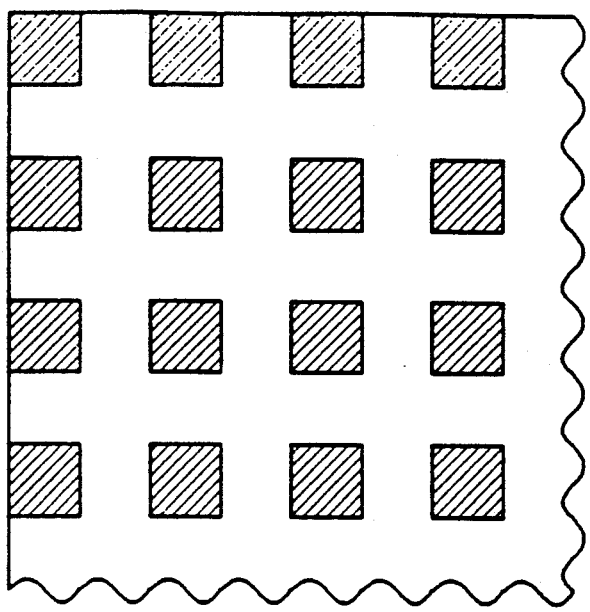
Figure 8D:
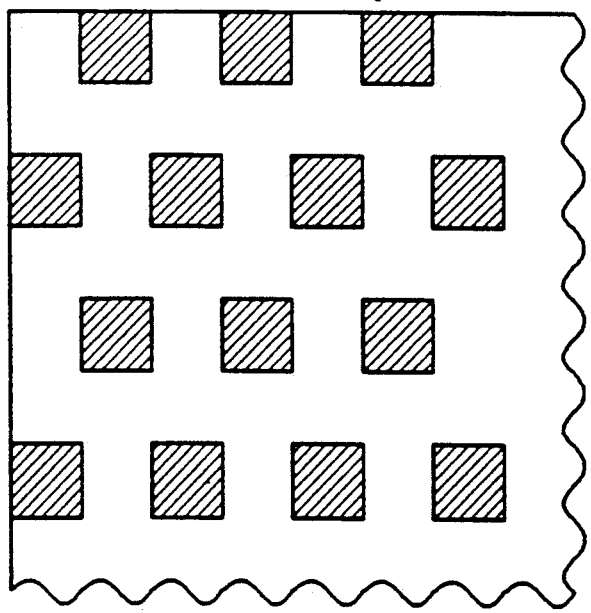

In the example of FIG. 4, longitudinal lines are thinned out. FIG. 8A shows a method of thinning out a horizontal line indicated by the shaded portion, FIG. 8B a method of thinning out slanted lines indicated by the shaded portions, and FIG. 8C a method of thinning out one pixel, indicated by the shaded portion, from every four pixels. FIG. 8D illustrates a slight improvement upon FIG. 8C. The timings for these various methods are adjusted by the timing generators 21, 33.

As described above, binary coding processing based on error dispersion is performed upon replacing the results of binary coding processing by predicted values at a predetermined timing. When data are transmitted, the predicted values are thinned out to reduce the quantity of data. Conversely, when data are received, data are interpolated by the predicted values. Simple processing of this kind makes it possible to compress a pseudo-half-tone image in an error dispersion method while preserving the data.

Example of compression coding for controlling predicted hit rate

Figure 9:
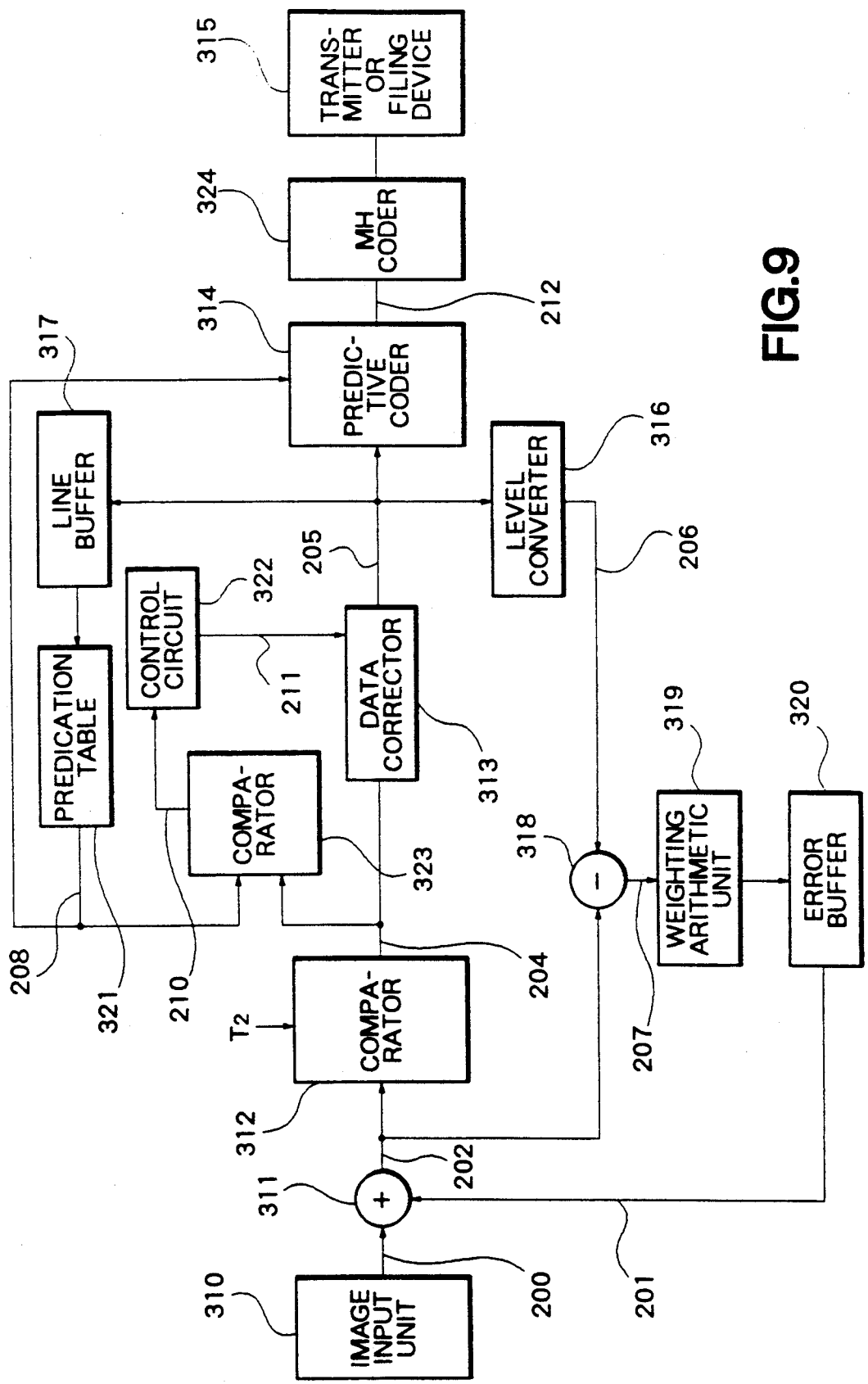
FIG. 9 is a block diagram of an image data coding apparatus in a second example.
Figure 10:
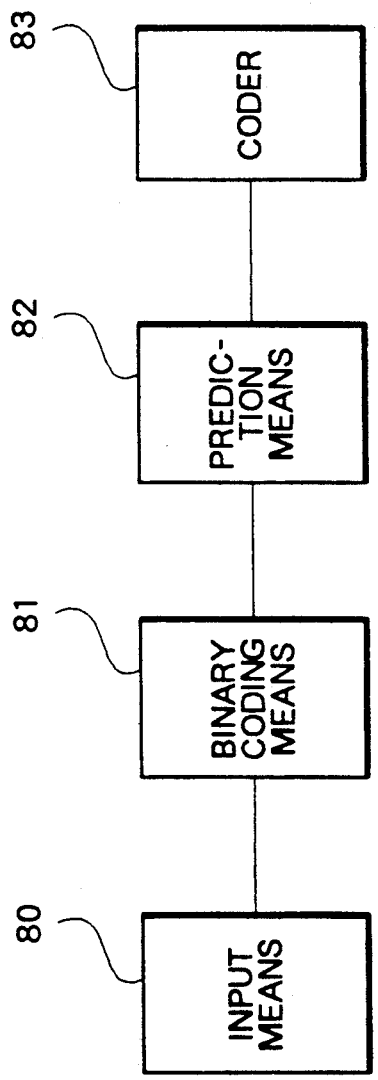
FIG. 10 is a block diagram of a conventional system.

FIG. 9 is a block diagram of ah image data coding apparatus according to the embodiment.

Output data 200 from an image input unit 310 is a digital signal having eight-bit tone information. An error buffer 320 outputs a correction signal 201 of a pixel of interest. The signal 201 is added to the signal 200 by an adder 311, the output of which is a signal 202 indicative of the sum. This signal is compared with a fixed threshold value $T_2$ by a comparator 312, the output 204 of which is "1" when signal 202 is larger than $T_2$ and "0" when signal 202 is smaller. The comparator output 204 enters a data correction circuit 313, the output of which is a corrected binary-coded signal 205. This signal enters a level converter 316, where one-bit data is returned to eight-bit data ("0" → "0", "1" → "255"). A level-converted output signal 206 from the level converter 205 is applied to a subtracter 318, which calculates the difference between the converted signal 206 and the signal 202 from adder 311. The result is binary-coded error data 107 which, in order to be dispersed among unprocessed peripheral pixels, is made a signal quantity conforming to a distribution ratio by a weighting arithmetic unit 319. This is delivered to the error buffer 320 where it is accumulated in the memory of the corresponding pixel position. The result is the correction signal 201.

The corrected binary-coded signal 205 from the data correction circuit 313 is applied also to a line buffer 317, where several lines of the signal are stored. The output of the line buffer 317 is applied to a prediction table 321, at which a predicted value 208 of the pixel of interest is obtained and outputted by referring to the data from the line buffer 317. The predicted value 208 enters one input terminal of a comparator 323, where it is compared to the binary-coded signal 204. The result of the comparison, namely a signal 210 from the comparator 323, is applied to a control circuit 322.

The control circuit 322 delivers a data correction signal 211 to the data correction circuit 313 at a set timing to apply a correction for non-coincident pixels.

There are two conceivable examples of set timing: (1) a method of performing control in such a manner that a specific ratio in non-coincident pixels is made a coincident pixel, and (2) a method of performing control in such a manner that all non-coincident pixels on a specific line are made a coincident pixel.

The corrected binary-coded signal 205 indicative of corrected data enters a predictive coder 314 to be subjected to predictive coding. The coder 314 produces a signal 212 applied to an MH coder 32 4, where the signal is subjected to data compression by the modified Hoffman (MH) coding method. The compressed data are delivered to a transmitter or filing device 315.

Figure 11:
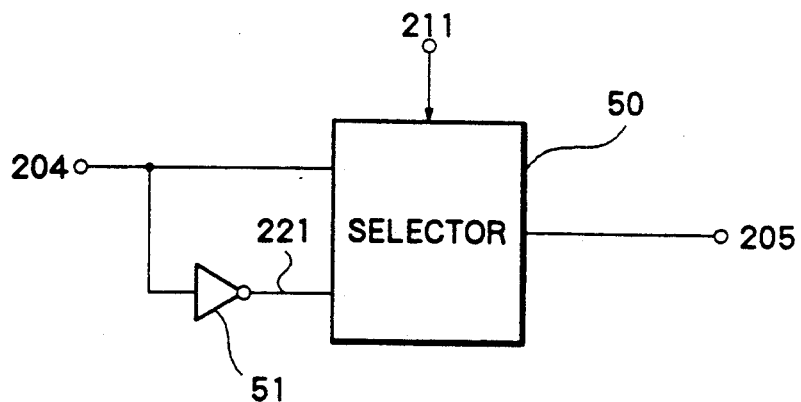
FIG. 11 is a block diagram of a data correcting circuit in the second example.

FIG. 11 is a view showing an embodiment of the data correction circuit. The binary-coded signal 204 is inverted into a signal 221 by an inverter 51, and both the signal 204 and signal 221 are applied to a selector 50. The latter switches between these two signals in response to the control signal 211 to obtain the corrected binary-coded signal 205. At the time of control, the control signal 211 selects the inverted signal 221 to make the corrected binary-coded signal 205 coincide with the corrected value 208.

Figure 12:
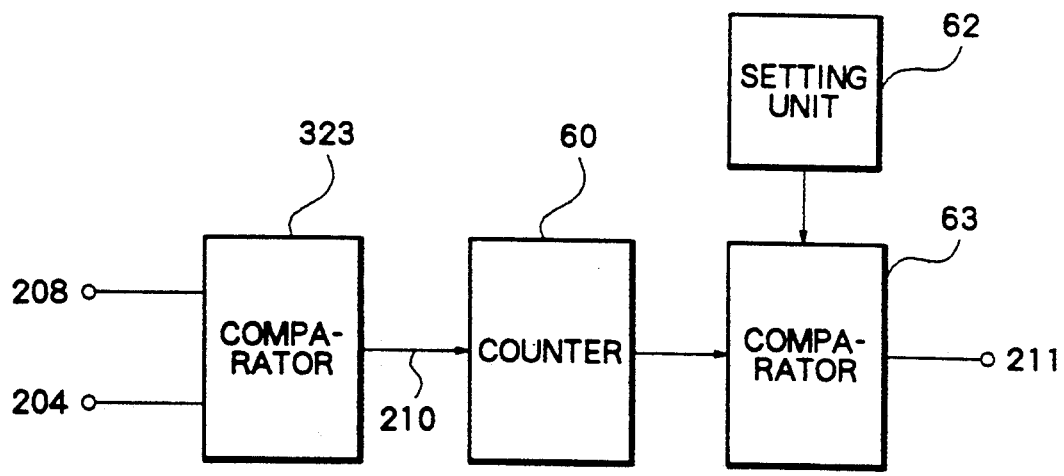
FIG. 12 is a block diagram of a control circuit in the second example.

FIG. 12 shows an embodiment of the comparator 323 and the control circuit 322. The comparator 323 outputs the signal 210, which indicates whether the binary-coded data 204 and predicted value 208 coincide. The signal 210, the logical value of which is "1" if the data 204 and predicted value do not coincide, is counted by a counter 60. A parameter for performing control at predetermined pixel intervals of non-coincident pixels is set in a setting device 62. A comparator 63 compares the count in counter 60 with this parameter, whereby the control signal 211 becomes logical "1" at predetermined pixel intervals. This makes it possible to reduce the number of missed pixels predicted, as a result of which the coding efficiency of predictive coding is improved.

Figure 13:
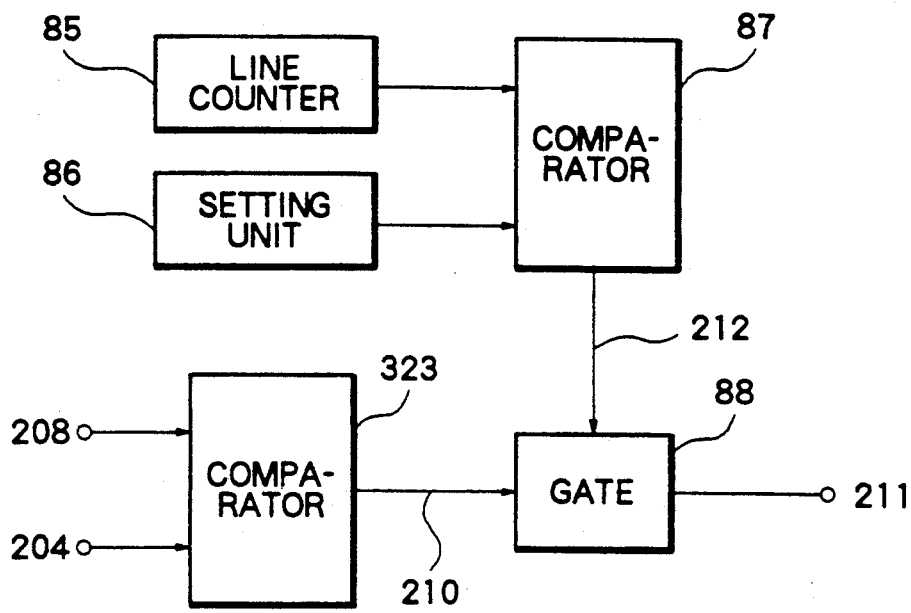
FIG. 13 is a block diagram of another embodiment of the control circuit of the second example.

FIG. 13 shows another embodiment of the comparator 323 and control circuit 322. Here a line counter 85 counts up the number of lines of pixel data. Data corresponding to the operating line interval is set in a setting device 86. A comparator 87 determines whether a line is an operating line; if it is, the signal 212 is made logical "1". A gate 88 operates to gate a non-coincidence signal 210 by a gate signal 212. The control signal 211 becomes logical "1" only when the two inputs to the gate 88 exhibit "1" logic. As a result, all of the data on a specific line become equal to the predicted values and the run length of predictive coding is enlarged to improve coding efficiency.

Figure 14:
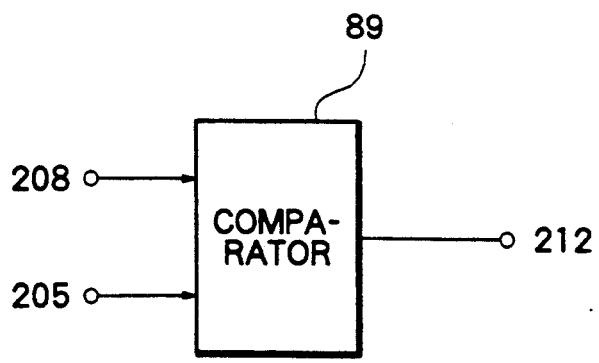
FIG. 14 is a block diagram of an MH coding circuit of the second example.

FIG. 14 shows an embodiment of a predictive coder. The binary-coded data 205 corrected by the data correction circuit 313 and the predicted value 208 are compared by a comparator 89. The latter produces the predictive coded data 212, which is "1" when the two compared signals are equal and "0" when they are unequal. The signal 212 is delivered to the MH coder 324.

Example of compression coding suited to arithmetic coding

Besides MH coding, an arithmetic coding method is available as a method of binary image coding. In arithmetic coding, there is a tendency toward shorter code length the lower the probability of occurrence of numerically inferior symbols having a low frequency of generation.

Numerically inferior symbols and their rate of occurrence differ depending upon the peripheral conditions. For example, as shown in FIGS. 17A through 17D, a case will be considered in which a pixel of interest is decided from four peripheral pixels. In the case of FIG. 17A, black is a numerically inferior symbol and the probability is $\frac{1}{8}$. In case of FIG. 17B, the probabilities are both $\frac{1}{2}$, $\frac{1}{2}$. In FIG. 17C, white is a numerically inferior symbol and the probability is $\frac{1}{8}$. In case of FIG. 17D, the probabilities usually are both $\frac{1}{2}$, $\frac{1}{2}$. However, if the probability of occurrence of black is held to $\frac{1}{4}$ to obtain a numerically inferior symbol by controlling binary-coded data, for example, then this will make it possible to raise the coding efficiency of arithmetic coding.

Figure 15:
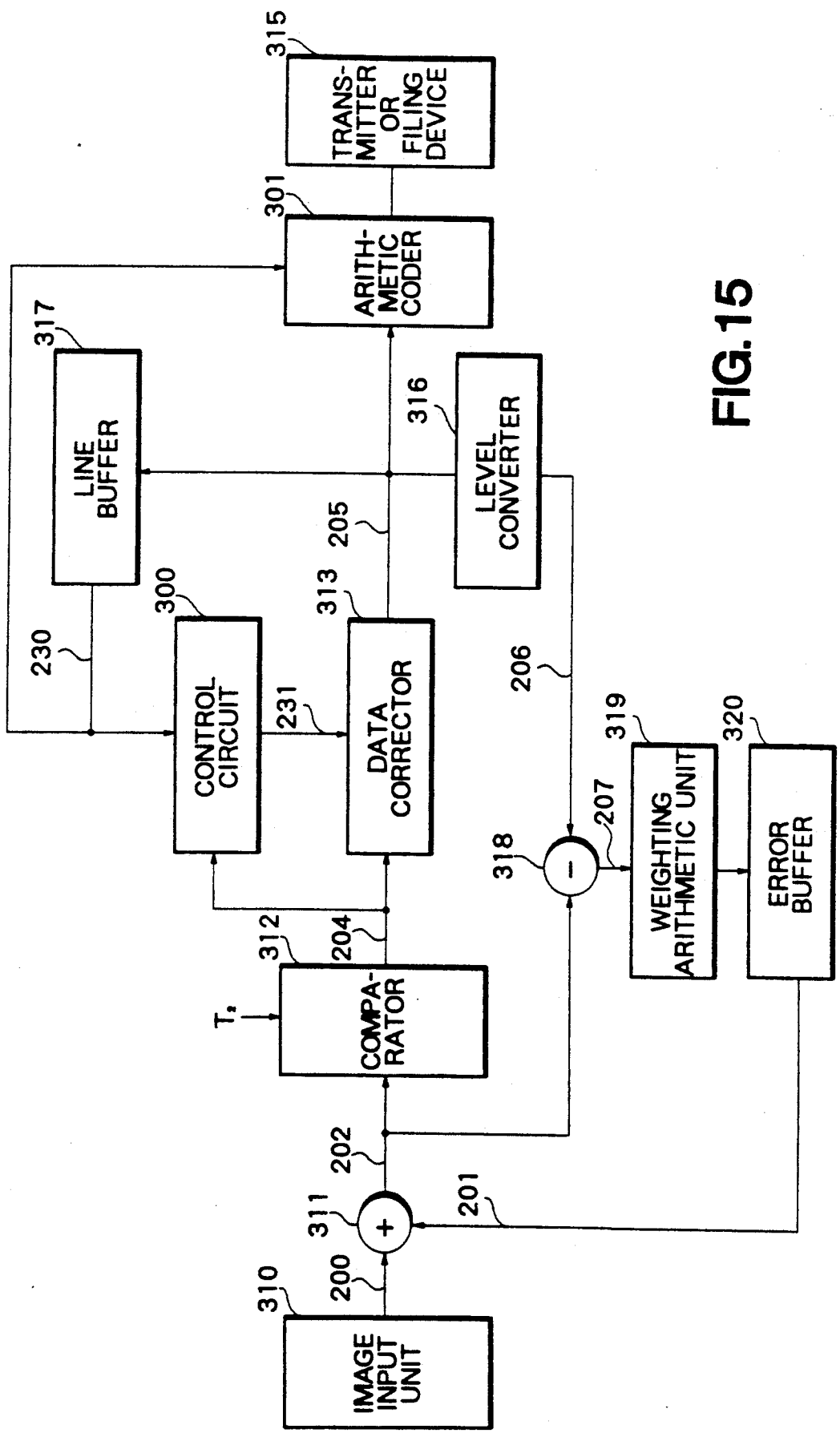
FIG. 15 is a block diagram of an image data coding apparatus in a third example.

FIG. 15 is a block diagram of an image data coding apparatus of the present embodiment. Portions having the same reference characters as those in FIG. 9 exhibit the same functions. The binary-coded data 204 and a peripheral pixel signal 230 from the line buffer 317 enter a control circuit 300, which outputs a control signal 232 applied to the data correction circuit 313. An arithmetic coder 301, to which the corrected binary-coded data 205 and peripheral pixel signal 230 are applied, performs arithmetic coding.

Figure 16:
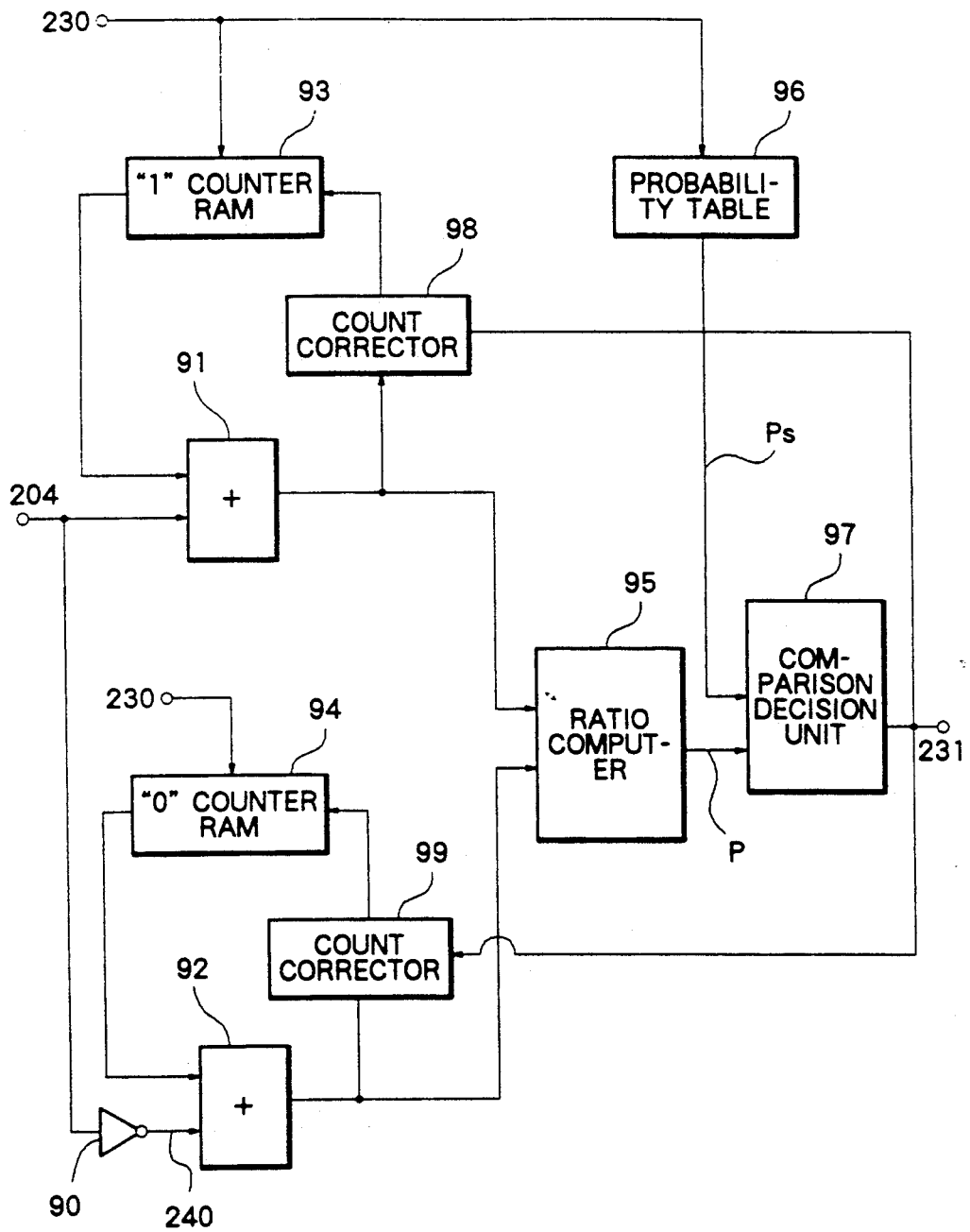
FIG. 16 is a block diagram of a control circuit of the third example.

FIG. 16 is a block diagram of the control circuit 300. The binary-coded data 204 are applied to one input terminal of an adder 91 and to an inverter 90 whose inverted output signal 240 is applied to one input terminal of an adder 92. The peripheral pixel signal 230 from the line buffer 317 enters RAM's 93, 94 for counters. Accumulated values are read out of respective memories corresponding to the peripheral pixel patterns, and the read values are connected to the other input terminals of the adders 91, 92. The resulting outputs of the adders 91, 92 are re-recorded in the respective RAM's 93, 94 and enter a ratio computing unit 95 at the same time. The latter computes the "1" occurrence probability and the "0" occurrence probability and adopts the smaller as a numerically inferior symbol.

Meanwhile, in response to the peripheral pixel signal 230, a correspondingly set numerically inferior symbol and occurrence probability enter a comparison decision unit 97 from a probability table 96. The comparison decision unit 97 compares an occurrence probability P, outputted up to the present by the ratio computing unit 95, and a set probability $P_S$. When $P > P_S$ holds, the control signal 231 is made "1" to correct the binary-coded data 204. When the binary-coded data 204 are corrected, the numbers of "1"s and "0"s being counted change. Therefore, in order to preserve the image data, the counts are changed by count correction circuits 98, 99 to achieve coordination with the binary-coded data 204. In this example, −1 is the correction applied by count correction circuit 98 and +1 the correction applied by count correction circuit 99 in a case where the control signal 231 is "1". The data correction circuit 313 carries out a similar correction, with the control signal 211 of FIG. 11 being changed to the control signal 231.

FIG. 18 illustrates the occurrence probabilities of the white pixels and black pixels in the patterns of FIGS. 17A through 17D.

As described above, in a coding method using prediction, binary coding processing employing an error diffusion method is performed so as to improve predicted hit rate, and it becomes possible to raise coding efficiency in relation to these images.

Further, though MH coding and arithmetic coding are described in the present embodiment, it is obvious that the present invention is capable of providing the same effects in other forms of predictive coding as well.

As many apparently widely different embodiments of the present invention can be made without departing from the spirit and scope thereof, it is to be understood that the invention is not limited to the specific embodiments thereof except as defined in the appended claims.

What is claimed is:

1. An image data coding method comprising the steps of:
   inputting image data;
   binarizing the inputted image data to make binary data;
   predicting a binary datum of an interested pixel based on binary data of a plurality of pixels peripheral to the interested pixel;
   comparing a result of binarizing in said binarizing step with a result of predicting in said predicting step;
   controlling the binary data made in said binarizing step so as to match the result of binarizing and that of said predicting step, in the case where these results are different from each other;

performing a predictive-coding based on the binary data predicted in said predicting step and the binary data controlled in said controlling step; and correcting an error between the binary data controlled in said controlling step and said input image data;

wherein, in said controlling step, the binary data made in said binarizing step are controlled so as to improve a hit rate of prediction in said predictive-coding step.

2. The method according to claim 1, wherein in said controlling step, said hit rate of prediction rises by changing the result of said binarizing step for a binary datum to the result of said predicting step for an interested pixel at a specific rate when the results of said binarizing step and said predicting step are different.

3. The method according to claim 1, wherein in said controlling step, said hit rate of prediction rises by changing the result of said binarizing step to the result of said predicting step for an interested pixel on a specific line, when the results of said binarizing step and said predicting step are different on the specific line.

4. The method according to claim 1, wherein when performing said predictive coding step, a binary datum is determined in accordance with whether or not the binary datum predicted in said predicting step is equal to a corresponding binary datum controlled in said controlling step.

5. The method according to claim 4, further comprising the step of compressing the binary data from said predictive coding step by an MH method.

6. The method according to claim 1 wherein in said correcting step, a difference between a binary datum controlled in said controlling step and an input image-daum which is not binarized and which corresponds to the controlled binary datum is calculated, and the difference is added to a plurality of pixel data for subsequent input.

* * * * *

UNITED STATES PATENT AND TRADEMARK OFFICE
CERTIFICATE OF CORRECTION

PATENT NO. : 5,282,256
DATED : January 25, 1994
INVENTOR(S) : HIDEFUMI OHSAWA, ET AL.

It is certified that error appears in the above-identified patent and that said Letters Patent is hereby corrected as shown below:

COLUMN 3

Line 25, "i" should read --in the--.

COLUMN 4

Line 62, "$X_4$)" should read --$X_4$). In--.

COLUMN 6

Line 7, "ah" should read --an--.
Line 57, "MH coder 32 4," should read --MH coder 324,--.
Line 59, "Hoffman" should read --Huffman--.

COLUMN 10

Line 13, "claim 1" should read --claim 1,--.
Line 15, "image-" should read --image--.
Line 16, "daum" should read --datum--.

Signed and Sealed this

Twenty-sixth Day of July, 1994

Attest:

BRUCE LEHMAN

Attesting Officer     Commissioner of Patents and Trademarks